US005390753A

United States Patent [19]

Parker

[11] Patent Number: 5,390,753

[45] Date of Patent: Feb. 21, 1995

[54] PERSONAL WALKER WITH POWERED WHEELS

[76] Inventor: Bruce H. Parker, 26038 Charing Cross Rd., Valencia, Calif. 91355

[21] Appl. No.: 17,238

[22] Filed: Feb. 16, 1993

Related U.S. Application Data

[63] Continuation of Ser. No. 642,225, Jan. 15, 1991, abandoned.

[51] Int. Cl.[6] .................................... B60K 1/00

[52] U.S. Cl. .................................... 180/19.1; 180/65.6; 280/87.041; 475/182

[58] Field of Search .................... 280/87.021, 87.041, 280/87.05, 87.051; 180/19.1, 65.6, 65.1; 135/67; 74/665 GE; 297/5; 475/29, 182, 230

[56] References Cited

U.S. PATENT DOCUMENTS 436,970 9/1890 Edison .................... 474/29
1,028,009 5/1912 Fancher .................... 475/182
1,202,395 10/1916 Ledeboer .................... 475/182
3,256,035 6/1966 Garringer .................... 280/87.021 X
3,543,608 12/1970 Meihak .................... 475/182
3,840,077 10/1974 Smith .................... 180/19.1 X
4,161,226 7/1979 Warner et al. .................... 180/65.6
4,463,817 8/1984 Mennesson .................... 280/87.041 X
5,064,012 11/1991 Losego .................... 180/19.1

*Primary Examiner*—Karin L. Tyson
*Assistant Examiner*—Michael Mar
*Attorney, Agent, or Firm*—Louis J. Bachand

[57] ABSTRACT

A power driven personal walker for the infirm and handicapped comprising laterally spaced uprights for grasping by a user in a walking position, a horizontal base frame supporting the uprights in use position rearwardly open to the legs and feet of the user and having a transverse front portion, a wheel assembly, and means to drive the wheels including a motor coupled to said axle means in wheel driving relation.

5 Claims, 2 Drawing Sheets

PERSONAL WALKER WITH POWERED WHEELS

REFERENCE TO RELATED APPLICATION

This application is a continuation of my application Ser. No. 07/642,225, filed Jan. 15, 1991, now abandoned.

FIELD OF THE INVENTION

This invention relates to personal support devices used by the physically infirm and handicapped as an aid in walking, and more particularly to personal walkers with power driven wheels for easing personal movement, eliminating laborious lifting of walkers now inherent in their use, increasing stability while moving without decreasing stationary stability, and enhancing the sense of personal freedom of the user.

BACKGROUND OF THE INVENTION

Personal walkers are used by the infirm and the handicapped for support while walking. A difficulty with their use is the need to lift the walker with each step advance, as the typical walker has rubber feet to give frictional contact with the ground. This repetitive lifting motion is tiring, inhibits a normal gait, and removes support from the user; instead the user momentarily supports the walker.

SUMMARY OF THE INVENTION

It is accordingly an object of the invention to provide a new walker, one which is characterized by power-driven wheels, and which not only retains the stability of previously known walkers, but which eliminates moments of non-support occurring in lifted walkers. Another object is provision of a personal walker which smoothly proceeds across a variety of terrains, turning corners and negotiating grades, all while supporting the user continuously, as the user guides the walker.

These and other objects are realized in accordance with the invention in a personal walker for the infirm and handicapped comprising an upright for grasping by a user in a walking position, a horizontally extended, generally U-shaped base supporting the upright in use position, the base including a transverse front portion and left and right side portions extending rearwardly from the base front portion in spaced relation, whereby the base is open to the feet of the user; left and right drive wheels carried on the base side portions, a plurality of idler wheels carried on the side portions to support the walker in upright position cooperatively with the drive wheels, a motor supported by the base, and means coupling the drive wheels to the motor for selective operation to advance the walker in concert with walking steps of the user.

In particular embodiments: the upright comprises left and right upright portions supported respectively by the left and right base side portions in position for grasping by the user in walking position; there is included also axle means for each drive wheel, and axle means supports midway along the length of each of the base side portions; the means coupling the drive wheels to the motor includes a drive shaft, and drive belts engaged with the drive shaft and the drive wheels; and the drive shaft includes differential means for differentially driving the drive wheels.

In a more particularly preferred embodiment the invention provides a personal walker for the infirm and handicapped comprising left and right uprights defining means for grasping by a user in a walking position, a horizontally extended, generally U-shaped base having rearwardly extending side portions supporting the uprights in use position and a transverse front portion, the base being rearwardly open to the legs and feet of the user, left and right drive wheels journaled on axles carried by the base side portions, and means to drive the wheels including a motor coupled to the wheels.

In this and like embodiments, the invention further includes idler wheels arranged to ensure stability of the walker in cooperation with the drive wheels, and the drive means comprises a drive shaft driven by the motor, and left and right drive belts coupling the left and right drive wheels to the drive shaft, the drive shaft comprises left and right shaft portions, and there is also provided differential means between the left and right shaft portions whereby the left and right wheels are differentially driveable by the motor for ease of turning the walker with the drive wheels in ground contact.

For convenience in storage and transport of the personal walker, in certain embodiments the uprights are detachably connected to the base.

THE DRAWING

The invention will be further described as to an illustrative embodiment thereof in conjunction with the attached drawings, in which.

DETAILED DESCRIPTION

Figure 1:
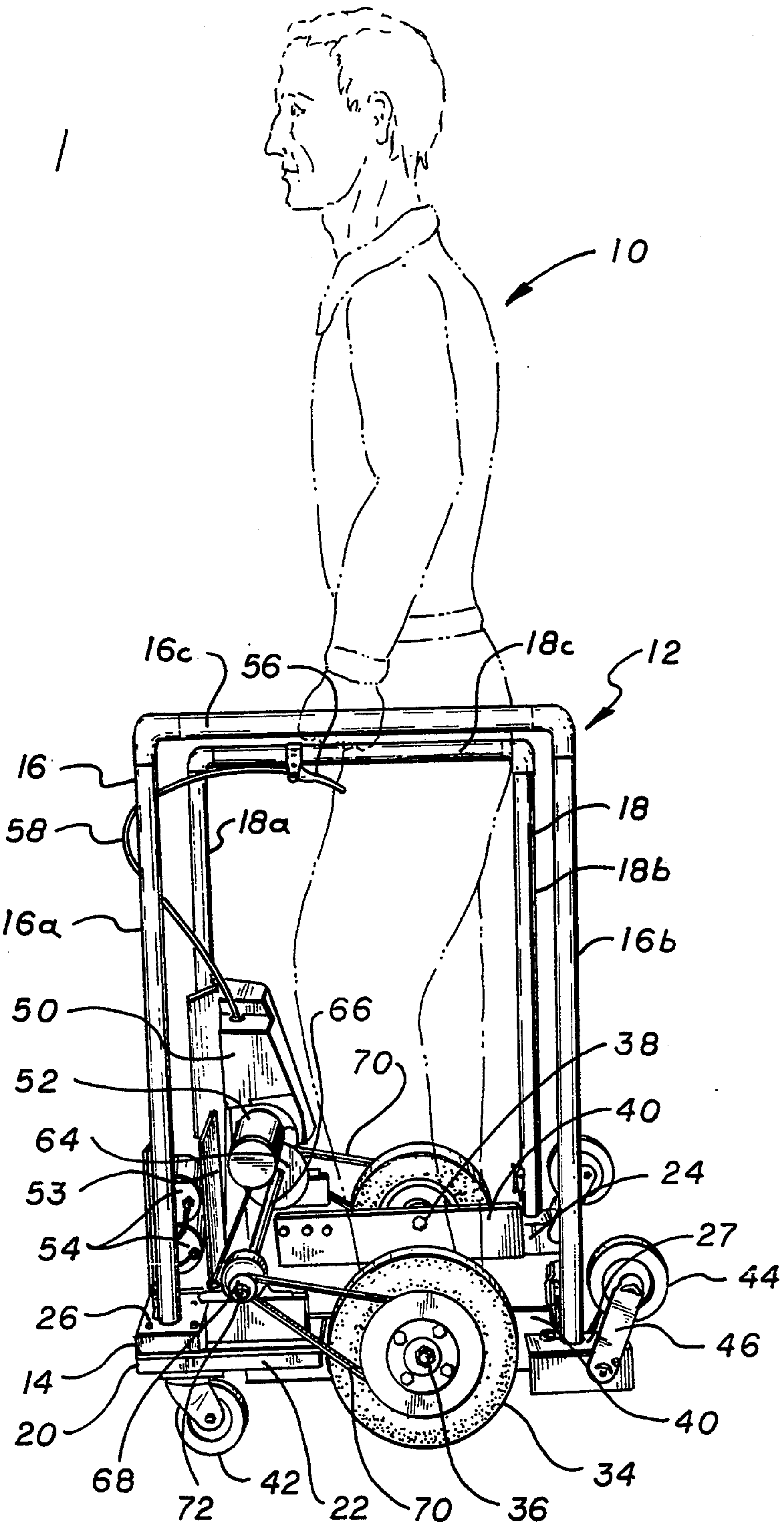
FIG. 1 is a side elevation view of the personal walker.
Figure 2:
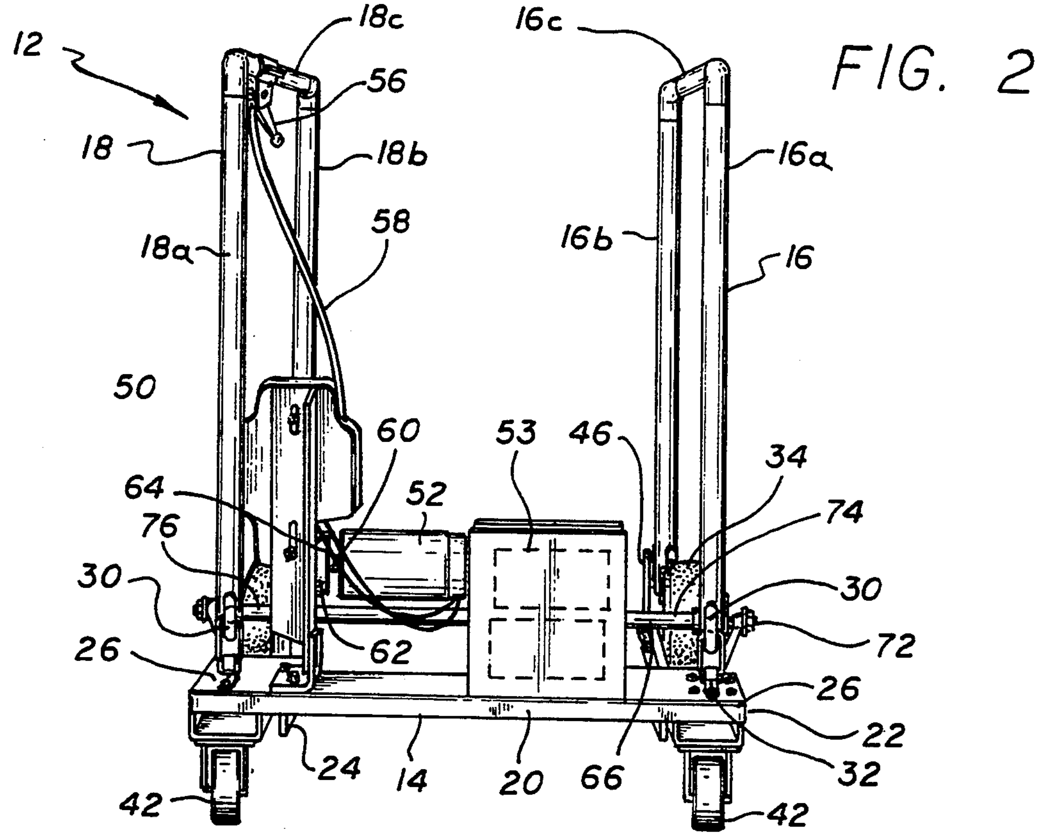
FIG. 2 is a front perspective view thereof.
Figure 3:
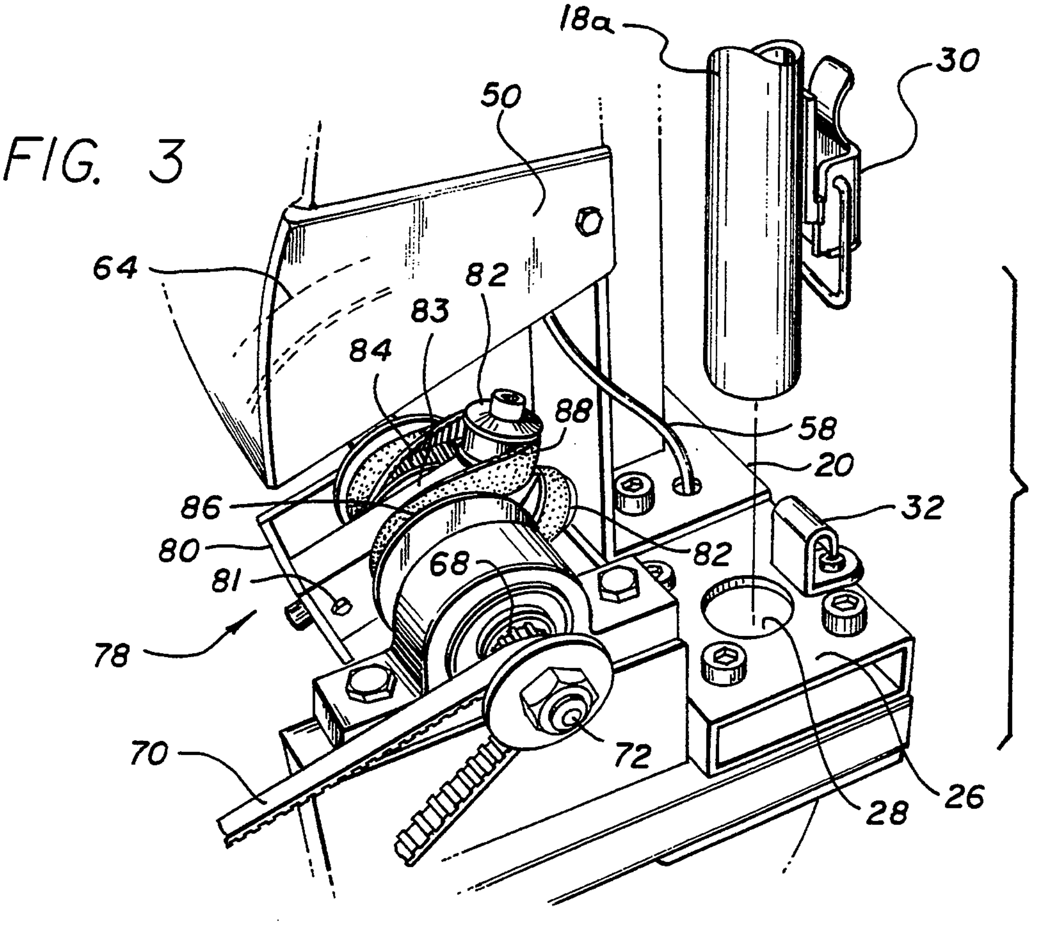
FIG. 3 is a fragmentary, detail view of the drive shaft.

With reference now to the drawings in detail, in FIG. 1 user 10 is supported while walking by the personal walker generally indicated at 12. The walker 12 includes a base 14, and left and right uprights 16, 18 supported thereby, the uprights comprising front and rear vertical elements 16*a*, 16*b*, 18*a*, 18*b* and cross-elements 16*c*, 18*c*, suitably of tubular steel, these being of a height to be convenient for grasping by a user in walking position, as shown. The base 14 is generally U-shaped, FIG. 2, to allow entry of the user's feet, with a transverse front portion 20, and left and right side portions, 22, 24, extending rearwardly from the front portion, each made of metal angles, or all molded of plastic in an integral form (not shown). The uprights 16, 18 are each set in rectangular corners 26, 27 of the base front and side portions 20, 22, 24. These corners 26, 27 are apertured at 28 to receive the downward ends of the upright vertical elements 16*a–b*, 18*a–b*. Over-center clamps 30 are mounted to the elements 16*a–b*, 18*a–b*, and cooperate with keepers 32 on corners 26 to lock the upright elements 16*a–b*, 18*a–b* in place, as best shown in FIG. 3. It will be noted that with the clamps 30, the uprights 16, 18 are readily demounted from the base 14, for purposes of storage or transport of the walker 12. Other types of clamps, or locking pins, may be used in place of the over-center clamps shown.

A pair of drive wheels 34 are provided on axles 36 mounted in bores 38 formed midway along the length of vertical flanges 40 of base side portions 22, 24. Cooperating with drive wheels 34 are front idler caster wheels 42 to maintain the walker 12 vertically stable. Secondary idler caster wheels 44 are provided carried on ears 46 for purposes of preventing rearward tipping of the walker 12.

A motor mounting bracket 50 is mounted on base 14 and supports motor 52; a second mounting bracket 53 supports batteries 54. A control 56 and control cable 58 extend from left cross element 18*c* down to the motor 52, for purposes of controlling the operation of the motor.

Motor 52 powers a geared output shaft 60 which drives belt 62 coupled to a drive gear 64 fixed to carrier housing 80 by bolt 81 for rotating the drive shaft by the differential 78. Gears 68 turn with the drive shaft and drive belts 70 which are coupled to gears fixed to the drive wheels 34, as shown.

Drive shaft 66 is a sleeve journaled on shaft 72 and is divided into respective left and right segments 74, 76. Between the segments 74, 76 and differentially coupling them is differential 78, which enables the drive wheels 34 to rotate independently of one another, for smooth cornering with the walker and absence of drag on the wheels during other than straight ahead travel.

The differential 78 shown is typical; other types of differentials can be used including those disclosed in U.S. Pat. No. 3,919,899, the disclosure of which is incorporated hereinto by this reference, and others having light weight and simple, reliable design. Differential 78 comprises the carrier housing 80 which supports opposed differential gears 82 on carrier 83 at right angles to drive-gears 84, 86 fixed to shaft segments 74, 76 respectively. A serpentine belt 88 is folded on itself, and engaged with and captured over gears 82 and gears 84, 86 such that relative rotation of the drive shaft segments 74, 76 causes the serpentine belt 88 to correspondingly rotate the differential gears on their axes and around the axis of the drive shaft, whereby relative rotation of the drive gears is accommodated without dragging the wheels 34.

There is thus provided a personal walker which is self-propelled under control of the user and which constantly keeps ground contact for greater assistance to the user.

I claim:

1. Personal walker for the infirm and handicapped comprising an upright for grasping by a user in a walking position, a horizontally extended, generally U-shaped base supporting said upright in use position, said base including a transverse front portion and left and right side portions extending rearwardly from said base front portion in spaced relation whereby said base is open rearwardly to admit the feet of the user, left and right drive wheels carried on said base side portions, a plurality of idler wheels carried on said side portions to support said walker in upright position cooperatively with said drive wheels, a motor supported on said base, and means coupling said drive wheels to said motor for selective operation to advance said walker in concert with walking steps of the user, said coupling means comprising first belt means coupling said motor with a drive gear, a differential having first and second gears fixed on separate tubular gear shafts, second belt means including a separate belt for drivingly coupling each of said tubular gear shafts to respective ones of said drive wheels, a central shaft extending through both of said tubular gear shafts and through said differential, said tubular gear shafts being journaled on said central shaft to define an axis of rotation for said first and second gears, and third belt means including a belt engaged with said first and second gears and a belt support plate supporting said belt between said gears, said third belt means being rotatable about said axis of gear rotation.

2. Personal walker according to claim 1, in which said upright comprises left and right upright portions supported respectively by said left and right base side portions in position for grasping by the user in walking position.

3. Personal walker according to claim 1, in which said third belt means is journaled on said central shaft.

4. Personal walker according to claim 1, in which said third belt support plate carries a first idler roller on which said belt of said third belt means is engaged.

5. Personal walker according to claim 4, in which said belt support plate carries a second idler roller arcuately spaced from said first idler roller and about which said belt of said third belt means is also engaged.

* * * * *